United States Patent [19]

Gerbier

[11] 4,009,320
[45] Feb. 22, 1977

[54] AIR DEPOLARIZATION CELL OR BATTERY
[75] Inventor: Gérard Gerbier, Poitiers, France
[73] Assignees: Saft-Societe des Accumulateurs Fixes et de Traction, Romainville; Compagnie Industrielle des Piles Electriques "Cipel", Levallois-Perret, both of France
[22] Filed: Mar. 8, 1976
[21] Appl. No.: 664,817
[30] Foreign Application Priority Data
  Mar. 11, 1975   France .............. 75.07550
[52] U.S. Cl. .................... 429/27; 429/39; 429/40
[51] Int. Cl.² ............ H01M 4/06; H01M 8/00
[58] Field of Search .................. 136/86 A
[56] References Cited
UNITED STATES PATENTS
3,871,920   3/1975   Gerbier .............. 136/86 A Primary Examiner—Donald L. Walton
Assistant Examiner—H. A. Feeley
Attorney, Agent, or Firm—Kenyon & Kenyon Reilly Carr & Chapin

[57] ABSTRACT

The invention concerns an air depolarization cell or battery. The positive electrode is supplied with air through at least one cavity formed by at least two funnels formed directly by molding or otherwise in the mass of the positive electrode separated by a portion of the mass of the positive electrode, each funnel communicating with the outside air at one of their ends and communicating together by a passageway similarly formed directly in the mass of the positive electrode at the level of their other ends. The ratio between the area of the surface of each funnel through which air flows into the electrode and the volume of air therein is different for the two funnels.

8 Claims, 4 Drawing Figures

AIR DEPOLARIZATION CELL OR BATTERY

The present invention relates to air depolarization cells or batteries and, more particularly, to air-zinc batteries, whose positive electrode is fed with air through at least one cavity provided in the latter.

An aim of the invention is to ensure a circulation of the air in the cavity so as to renew the oxygen consumed during the discharge of the battery.

The invention has among its objects an air depolarization battery comprising a negative electrode, an electrolyte and a positive electrode fed with air through at least one cavity, characterized in that the said cavity is formed by at least two funnels extending substantially from top to bottom of the said positive electrode, each communicating with the outside air at their upper parts and separated from each other by a portion of the mass of the positive electrode and communicating with each other at their lower parts or ends, the requisite ratio between the area of the surface over which air flows through each funnel of the electrode and the volume of air therein being different for the two funnels.

The directional references are relative to the normal operating position of the battery.

The speed of oxygen depletion of the air contained in the funnels being a function of its area-to-volume ratio, different concentrations of oxygen and hence different densities of gas tend to be established in the two funnels, this causing a draught effect from one funnel to the other and thus promoting circulation of air therein.

Other characteristics of the invention will become apparent from the description of the various embodiments given hereinbelow by way of an illustration having no limiting character, with reference to the accompanying drawing, in which.

Figure 1:
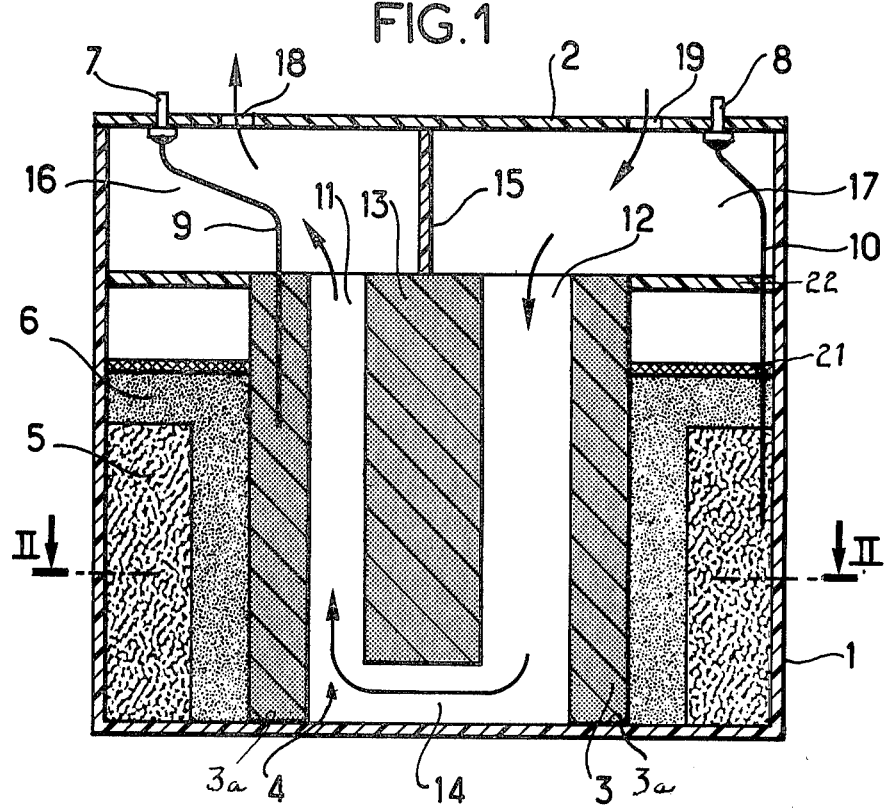
FIG. 1 is a vertical cross-sectional view of a cell or battery according to the invention taken along the line I—I of FIG. 2.
Figure 2:
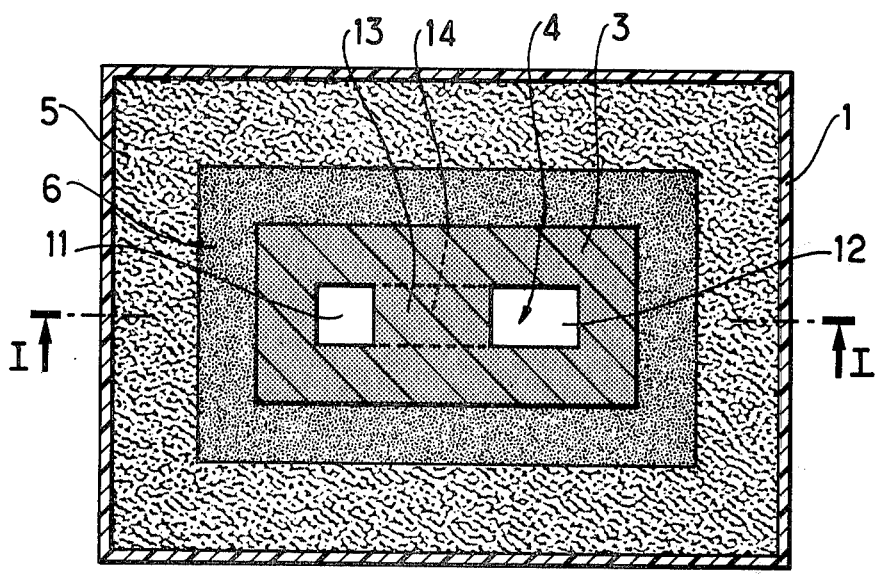
FIG. 2 is a cross-sectional view taken along the line II—II of FIG. 1.

The air depolarization cell or battery shown in FIGS. 1 and 2 comprises a casing formed by a can 1 and a cover 2 both made of plastic material, a positive electrode 3 basically containing active carbon, provided with a cavity 4, a negative electrode 5 basically containing zinc powder, arranged along the lateral wall of the can 1 and surrounding the positive electrode 3 and an alkaline gelled electrolyte 6 arranged between the positive electrode and the negative electrode and also above the latter. A positive terminal 7 and a negative terminal 8 are connected to the electrodes 3 and 5 respectively by metallic wires 9 and 10.

In the battery or cell in FIGS. 1 and 2, the cavity is formed directly in the mass of the positive electrode by two vertical funnels 11 and 12 separated from each other by the mass of the positive electrode in the zone 13. These funnels are connected together at their bases by a tunnel 14 also formed directly in said positive electrode. In the example illustrated, the funnel 11 has a square cross-section whose dimensions are $a \times a$ and the funnel 12 has a rectangular cross-section whose dimensions are $a$ and $b = 1.5a$. If $h$ is the height of the funnels above the tunnel 14, the lateral surface of the funnel 11, that is, the surface by which the air contained in that funnel is in contact with the positive electrode, has an area $S = 4\ ah$ and the corresponding volume of air is $V = a^2h$. The ratio between these two dimensions is $R = S/V = 4/a$. For the funnel 12, the corresponding values are $S = (2a + 2b)\ h = 5\ ah$, $V = abh = 1.5a^2h$ and $R = 10/3a$. The ratio R regulates the speed of oxygen depletion of the air for a given discharge rate of the cell or battery. That speed is, therefore, higher for the funnel 11 than for the funnel 12.

It ensues that the gaseous mixture contained in the funnel 11 is more depleted in oxygen, hence less dense, than that in the funnel 12 and a circulating flow is established in the cavity 4, the air entering through the upper end of the funnel 12, passing through the tunnel 14 and leaving through the upper end of the funnel 11.

The two funnels communicate by their upper parts with a free space in the top part of the battery. To improve the circulating flow, that space is divided by a partition 15 into a chamber 16 communicating with the funnel 11 and a chamber 17 communicating with the funnel 12. The air enters the chamber 17 through an orifice 19 in the cover 2 and leaves the chamber 16 through an orifice 18 in the cover 2.

The positive electrode 3 provided with the cavity 4 according to the invention can be made very simply by agglomerating the catalytic mass round a core mating the shape of the cavity and withdrawing the core from below.

To prevent leakages, in one direction or another, between the cavity 4 and the electrolyte 6 under the positive electrode, it is necessary to provide fluid-tight sealing means, for example, by glueing the electrode 3 at 3a onto the bottom of the can 1. If it were required to prevent the cavity from reaching the lower face of the positive electrode, it would be possible to cut the funnels obliquely, after the forming of the electrode, in such a way that they are joined together at the lower part without opening out.

An appropriate layer of pitch 21 overlies the upper surface of electrolyte 6. A separating disc 22 of suitable plastic material closes off the bottoms of respective chambers 16 and 17 to prevent access of air therein to the electrolyte 6.

Figure 3:
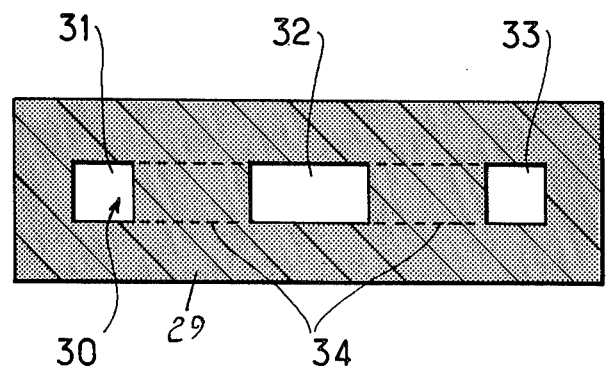
FIGS. 3 and 4 are respective horizontal cross-sectional views of positive electrodes for other cells or batteries according to the invention.

The positive electrode 29 shown in FIG. 3 differs from the electrode 3 in FIGS. 1 and 2 in that the cavity 30 is formed by 3 separate funnels 31, 32 and 33 connected together at their bases by a tunnel 34 all formed directly in the mass of the positive electrode, the axes of the three funnels being in a same plane. The end outermost funnels 31 and 33 have a square cross-section whose dimensions are $a \times a$ and the central funnel 32 has a rectangular cross-section whose dimensions are $a$ and $b = 2a$. Therefore, for the funnels 31 and 33, as in the previous example, the ratio of the surface area to the volume is $R = 4/a$ and for the funnel 32, the same calculations give $R = 3/a$. The gaseous mixtures in the funnels 31 and 33 is therefore lighter than in the funnel 32 and a circulating flow is established, the air entering through the funnel 32 and leaving through the funnels 31 and 33. Of course, to ensure maximum efficiency of that circulating flow, it is suitable to separate the upper space of the battery into three chambers communicating respectively with the three funnels or, even, by means of a partition having a suitable shape, into two chambers communicating, the one with the funnels 31 and 33 and the other with the funnel 32.

Instead of having identical funnels 31 and 33, it would be possible to provide three funnels having different ratios R. The circulating flow would then be effected mainly between the two funnels having the extreme values of R, the renewal of air being less rapid for the one having the intermediate value, this contingently causing a dissymmetry in the operation of the cell or battery.

Figure 4:
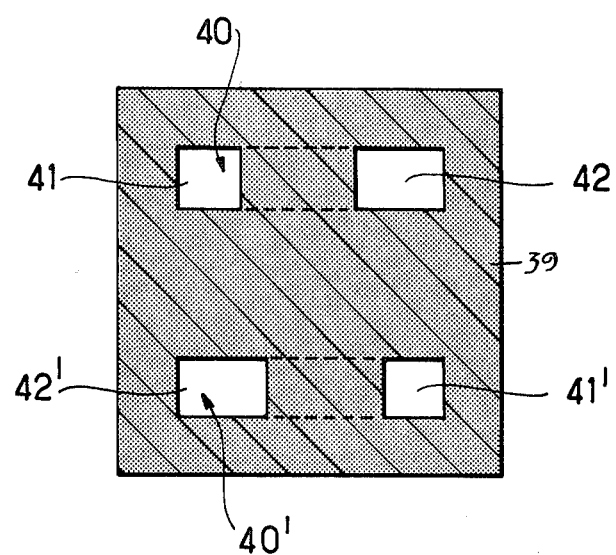

The arrangement in FIG. 3 is particularly suitable for a positive electrode elongated in one direction. That in FIG. 4 is adapted for an electrode having a square cross-section. The positive electrode 39 which is illustrated therein has two cavities 40 and 40' each formed by two funnels 41 and 42, 41' and 42'. Those cavities are each similar to the cavity 4 in FIGS. 1 and 2 and operate exactly in the same way. The number of chambers communicating with the respective funnels can be, here, 2, 3 or 4.

It must be understood that the invention is not limited to the embodiments described and illustrated as variations within the scope of the appended claims are possible and are contemplated, more particularly with respect to the shape and to the arrangement of the funnels. Thus, a positive electrode having a triangular cross-section can have a cavity formed by three funnels each arranged in the vicinity of a ridge of the electrode and congently having a triangular or circular cross-section, for example. An electrode having an elongated shape can have two or more cavities, each formed by three funnels, the axes of all of the funnels being coplanar. There is no intention, therefore, of limitation to the exact disclosure hereinabove presented.

The respective funnels herein described may in the alternative be defined as chimneys and the respective tunnels may also be defined as communicating passageways.

What is claimed is:

1. Air depolarization cell comprising a negative electrode, an electrolyte and a positive electrode having at least one cavity via which it is fed with air, characterized in that the said cavity comprises at least two funnels formed directly in the mass of the positive electrode and extending substantially from top to bottom of the said positive electrode, each funnel communicating with the outside air at its upper part, said funnels being separated from each other by a portion of the mass of the positive electrode, and a passageway for said funnels formed directly in the mass of said positive electrode and communicating with each other at their lower parts, the respective ratio between the area of the surface over which air flows through each funnel of the electrode and the volumes of air therein being different for the two funnels.

2. Cell according to claim 1, characterized in that the said cavity also comprises a third funnel also formed directly in the mass of said positive electrode and extending substantially from top to bottom of the positive electrode, and communicating with the outside air at its upper part, said third funnel being separated from the other two funnels by a portion of the mass of the positive electrode and communicating with those two funnels at its lower part, the ratio between the area of the surface over which air flows through the third funnel of the electrode and the volume of air therein being substantially the same for the said third funnel as for one of the said other two funnels.

3. Cell according to claim 1, characterized in that the said positive electrode has at least two cavities each having at least two funnels as defined in claim 1.

4. Cell according to claim 1, wherein one of said funnels has a ratio R which regulates the speed of oxygen depletion therein for a given discharge rate of the cell which is higher than the corresponding ratio R of the other funnel, R in each instance being defined as S/V where S is the respective funnel surface area and V the respective funnel volume.

5. Cell according to claim 4 wherein R for one funnel is equal to $4/a$, a being the funnel area and wherein R for the second funnel is $10/3a$.

6. Cell according to claim 1, including a second cavity also characterized by at least two funnels the respective ratio between the area of the surface over which air flows into each funnel of said two last-named funnels of said electrode to the volume of air therein being different for said two last-named funnels.

7. Cell according to claim 1 characterized in that said cavity comprises a third funnel, and wherein two of said funnels each have a ratio R which regulates the speed of oxygen depletion therein for a given discharge rate of the cell which is higher than the corresponding ratio R of the third funnel, R in each instance being defined as S/V where S is the respective funnel surface area and V the respective funnel volume.

8. Cell according to claim 1, including a casing, a cover therefor, said casing having a free space in the upper part of said casing between said cover and said positive electrode, and means subdividing said space into separate chambers respectively communicating with the upper part of the respective funnels, and said cover having a pair of openings respectively providing communication between respective of said chambers and outside air.

* * * * *